United States Patent
Won et al.

(10) Patent No.: US 7,640,044 B2
(45) Date of Patent: Dec. 29, 2009

(54) HINGE UNIT AND MOBILE TERMINAL HAVING THE SAME

(75) Inventors: Chang-Bai Won, Gyeonggi-Do (KR); Sang-Ho Han, Gyeonggi-Do (KR); Hong-Kyu Park, Seoul (KR); Yong-Duk Cha, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 566 days.

(21) Appl. No.: 11/299,090

(22) Filed: Dec. 8, 2005

(65) Prior Publication Data

US 2006/0197861 A1    Sep. 7, 2006

(30) Foreign Application Priority Data

Dec. 9, 2004    (KR)    ............. 10-2004-0103641
Jun. 16, 2005    (KR)    ............. 2005-52072

(51) Int. Cl.
*H04B 1/38*    (2006.01)
(52) U.S. Cl. ............. 455/575.3; 348/333.06
(58) Field of Classification Search ........... None
See application file for complete search history.

(56) References Cited

U.S. PATENT DOCUMENTS

| | | | | |
|---|---|---|---|---|
| 5,363,089 A * | 11/1994 | Goldenberg | ............. | 340/7.63 |
| 6,046,730 A | 4/2000 | Bowen et al. | | |
| 2004/0212956 A1 | 10/2004 | Kuivas et al. | | |
| 2006/0238970 A1 * | 10/2006 | Ukonaho et al. | ............. | 361/683 |

FOREIGN PATENT DOCUMENTS

| | | |
|---|---|---|
| EP | 1124175 A2 | 8/2001 |
| EP | 1324571 A | 7/2003 |
| EP | 1414219 | 4/2004 |
| EP | 1422593 A1 | 5/2004 |
| JP | 3033877 | 4/1991 |
| JP | 8-126050 | 5/1996 |
| JP | 8-169104 | 7/1996 |
| JP | 10201570 | 8/1998 |
| JP | 2002139024 | 5/2002 |
| JP | 2002-344597 | 11/2002 |
| JP | 2003-031959 | 1/2003 |
| JP | 2004-015209 | 1/2004 |
| JP | 2004096573 | 3/2004 |
| JP | 2004-254279 | 9/2004 |
| JP | 2004-336091 | 11/2004 |
| WO | 2004/046900 | 6/2004 |
| WO | WO 2004/095808 A2 | 11/2004 |

\* cited by examiner

*Primary Examiner*—Lester Kincaid
*Assistant Examiner*—Phuoc Doan
(74) *Attorney, Agent, or Firm*—Lee, Hong, Degerman, Kang & Waimey

(57) ABSTRACT

A mobile terminal comprising: a first body; a second body mounted in the first body to be folded and unfolded; and hinge units for rotatably hinge-connecting the first and second bodies, wherein the hinge units comprise: a first hinge unit mounted in the first body; a second hinge unit mounted in the second body, and rotatably engaged with the first hinge unit to have the same rotation angle as that of the first hinge unit; and a connection unit for rotatably connecting the first hinge unit to the second hinge unit, whereby the first body can be rotated up to 360° with respect to the second body so that videos and satellite broadcasting can be viewed more conveniently.

38 Claims, 18 Drawing Sheets

HINGE UNIT AND MOBILE TERMINAL HAVING THE SAME

CROSS REFERENCE TO RELATED APPLICATION

Pursuant to 35 U.S.C. § 119(a), this application claims the benefit of earlier filing date and right of priority to Korean Application Nos. 10-2004-0103641, filed Dec. 9, 2004 and 10-2005-0052072, filed Jun. 16, 2005, the contents of which are hereby incorporated by reference herein in their entirety.

BACKGROUND OF THE INVENTION

1. Field of the Invention

The present invention relates to a hinge unit and a mobile terminal having the same, and particularly, to a hinge unit and a mobile terminal having the same in which a user's convenience can be improved by enabling a rotating (folding or flipping) of first and second bodies by approximately 360°.

2. Background of the Related Art

FIG. 1 is a perspective view illustrating a related art mobile terminal.

A mobile terminal according to the related art includes: a first body 150 having a display 152 for displaying information; a second body 160 rotatably connected to the first body 150, provided with a keypad 162 for inputting information, and having a battery 164 at its rear surface; and hinge connection units 170 and 172 disposed between the first body 150 and the second body 160 for rotatably connecting the first body 150 with the second body 160.

The hinge connection units 170 and 172 include a first hinge portion 170 formed at the first body 150 and a second hinge portion 172 formed at the second body 160 and hinge-connected to the first hinge portion 170. Such hinge connection units 170 and 172 may maintain various opened angle positions between the first and second bodies 150 and 160 (e.g., such as about 160°) to allow the user to hold up the mobile terminal near his ear when making a typical voice call.

Thus, in the related art mobile terminal, the limited opened angle causes inconvenience in using the mobile terminal for various services such as viewing moving pictures (videos), movies, satellite broadcasting, or the like.

BRIEF DESCRIPTION OF THE INVENTION

Therefore, an object of the present invention is to provide a hinge unit and a mobile terminal having the same in which first and second bodies are connected to each other so that the first and second bodies can be rotated (i.e., flipped over, folded and unfolded, pulled back, etc.) by up to approximately 360°, and thus the mobile terminal can be more conveniently used in performing certain functions such as viewing multimedia contents, video conferencing, multimedia communications, and the like.

According to another object of the present invention, there are provided a hinge unit and a mobile terminal having the same in which the mobile terminal is laid in its horizontal direction for a convenient use upon viewing videos or satellite broadcasting.

To achieve these and other advantages and in accordance with the purpose of the present invention, as embodied and broadly described herein, there is provided a mobile terminal comprising: a first body; a second body mounted in the first body to be folded and unfolded; and hinge units for rotatably hinge-connecting the first and second bodies, wherein the hinge units comprise: a first hinge unit mounted in the first body; a second hinge unit mounted in the second body, and rotatably engaged with the first hinge unit to have the same rotation angle as that of the first hinge unit; and a connection unit for rotatably connecting the first hinge unit to the second hinge unit.

The first body is provided with displays for displaying information and speakers for generating sounds, and a pair of the speakers are installed in both edges of the first body in its longitudinal direction.

The first hinge unit may include a first coupling bracket mounted in the first body, and a first hinge portion formed at the first coupling bracket and rotatably hinge-connected to the connection unit.

The second hinge unit may include a second coupling bracket mounted in the second body, and a second hinge portion formed at the second coupling bracket and rotatably hinge-connected to the connection unit.

A first gear is formed at an outer circumferential surface of the first hinge portion in its circumferential direction, and a second gear is formed at an outer circumferential surface of the second hinge portion, the second gear being engaged with the first gear.

The connection unit may include a first connection unit inserted into one sides of both the first and second hinge portions, and a second connection unit inserted into the other sides of both the first and second hinge portions and coupled with the first connection unit.

The first connection unit may include a first rod inserted into the one side of the first hinge portion to rotatably support the first hinge portion, a second rod inserted into the one side of the second hinge portion to rotatably support the second hinge portion, and a connection rod for connecting the first rod with the second rod.

The second connection unit may include a first rod coupling portion inserted into the other side of the first hinge portion to couple the first hinge portion to the first rod, a second rod coupling portion inserted into the other side of the second hinge portion to couple the second hinge portion to the second rod, and a frame to which the first and second rod coupling portions are fixed.

The mobile terminal according to the present invention provides a position fixing unit disposed between the first hinge portion and the first rod and between the second hinge portion and the second rod, respectively, to fix rotated positions of the first and second bodies when both the first and second bodies are relatively rotated each other, wherein the position fixing unit may include: a plurality of grooves formed at an inner circumferential surface of the first hinge portion and an outer circumferential surface of the second hinge portion, respectively; a support rod inserted to be linearly movable into an insertion groove respectively formed at outer circumferential surfaces of the first and second rods in a radius direction thereof, each support rod being inserted into one of the plurality of grooves at each hinge portion, and a spring for applying an elastic force to the support rod.

The mobile terminal according to the present invention may further include a support lever rotatably disposed at the second body for supporting the state in which the mobile terminal is laid in its horizontal direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to some embodiments of the present invention, examples of which are illustrated in the accompanying drawings.

Such embodiments of a mobile terminal according to the present invention may exist in plurality. Hereinafter, the embodiments will be explained.

Figure 1:
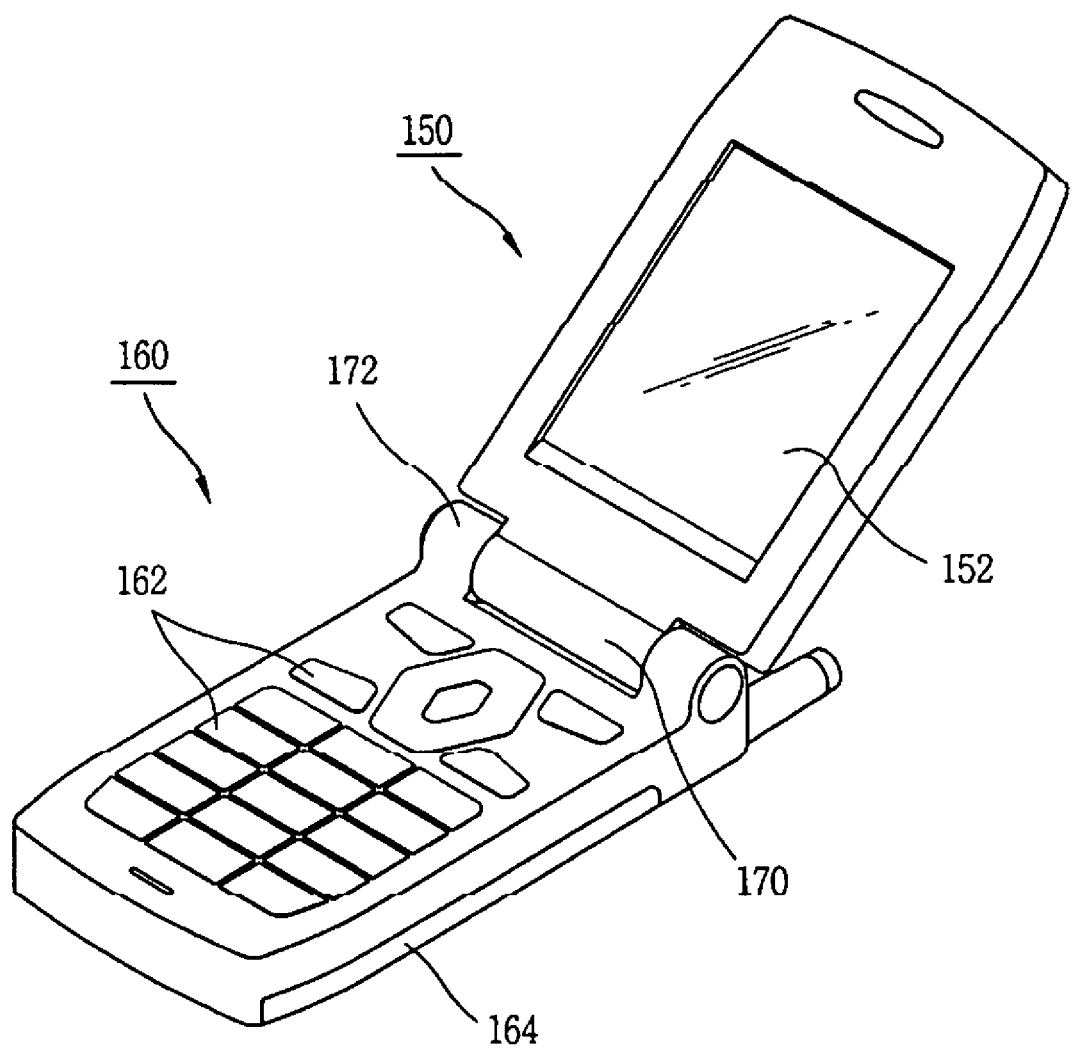
FIG. 1 is a perspective view showing a mobile terminal according to the related art.
Figure 2:
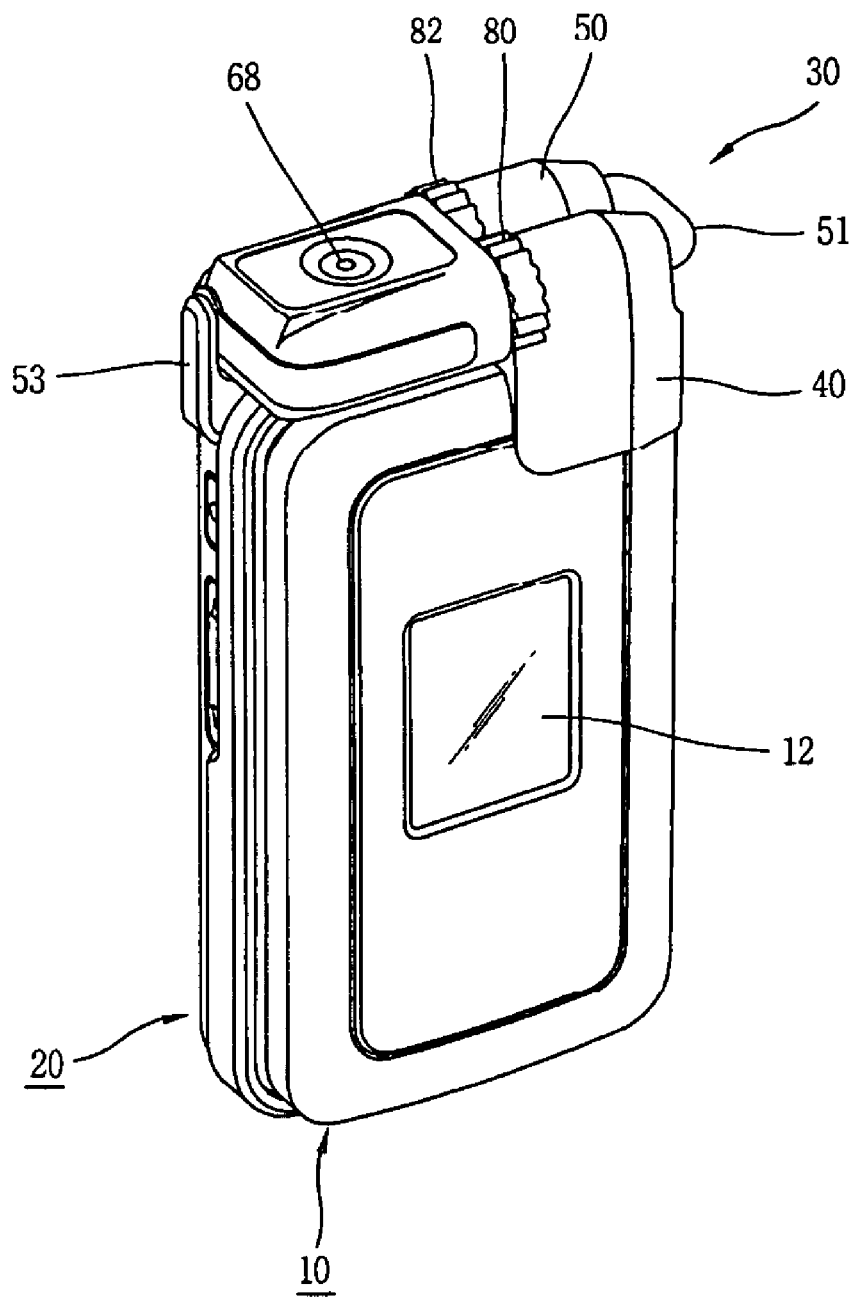
FIG. 2 is a perspective view showing a mobile terminal in accordance with an embodiment of the present invention.
Figure 3:
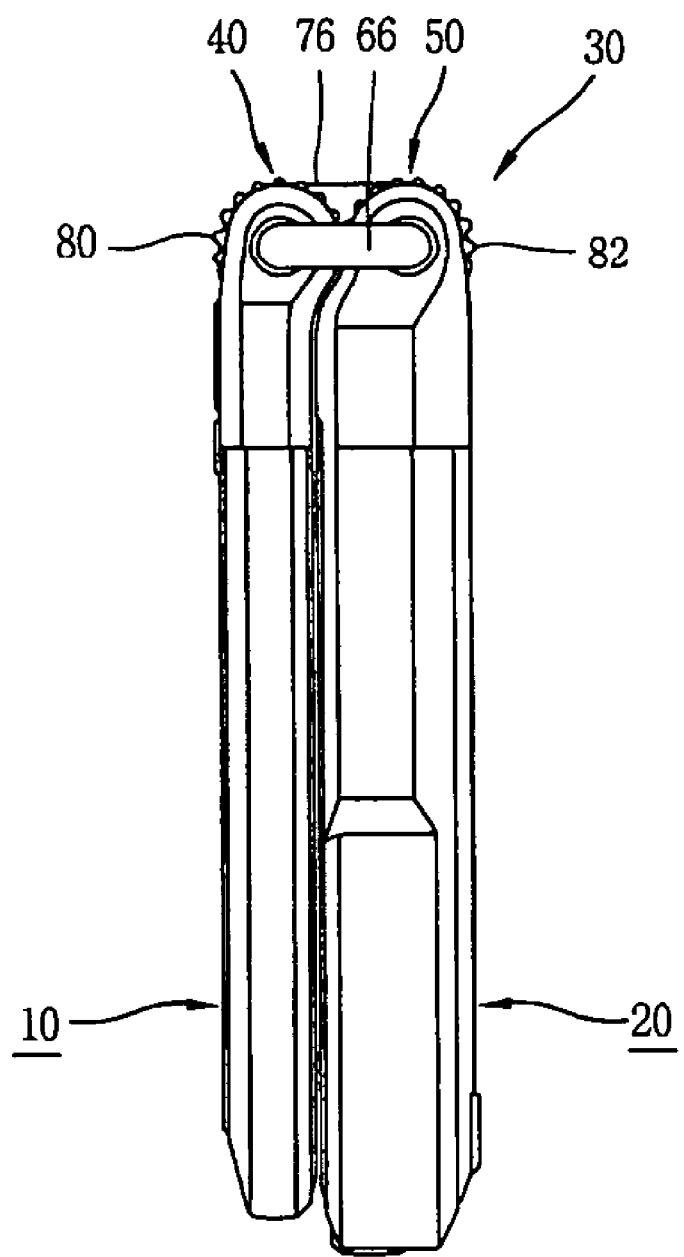
FIG. 3 is a lateral view showing one side of the mobile terminal in accordance with the one embodiment of the present invention.
Figure 4:
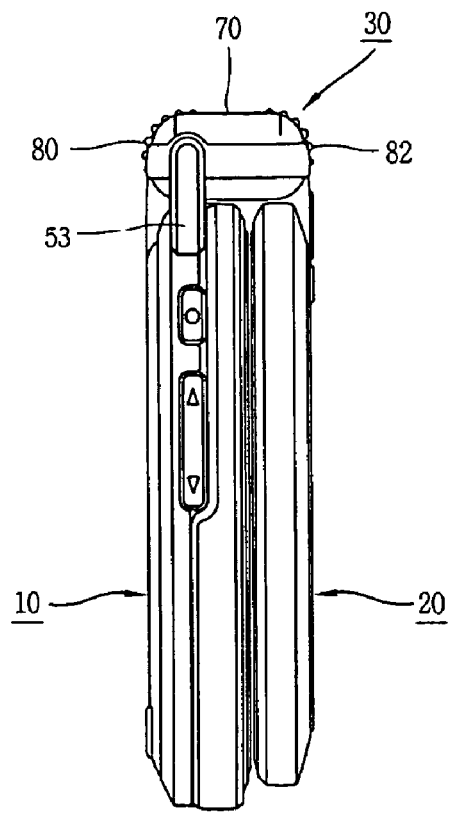
FIG. 4 is a lateral view showing another side of the mobile terminal in accordance with the one embodiment of the present invention.
Figure 5:
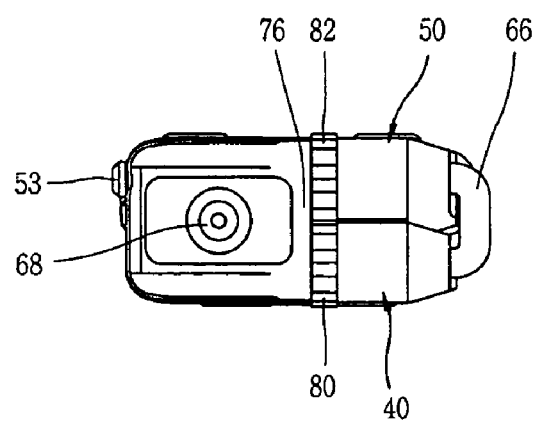
FIG. 5 is a view showing an upper surface of the mobile terminal in accordance with the one embodiment of the present invention.
Figure 6:
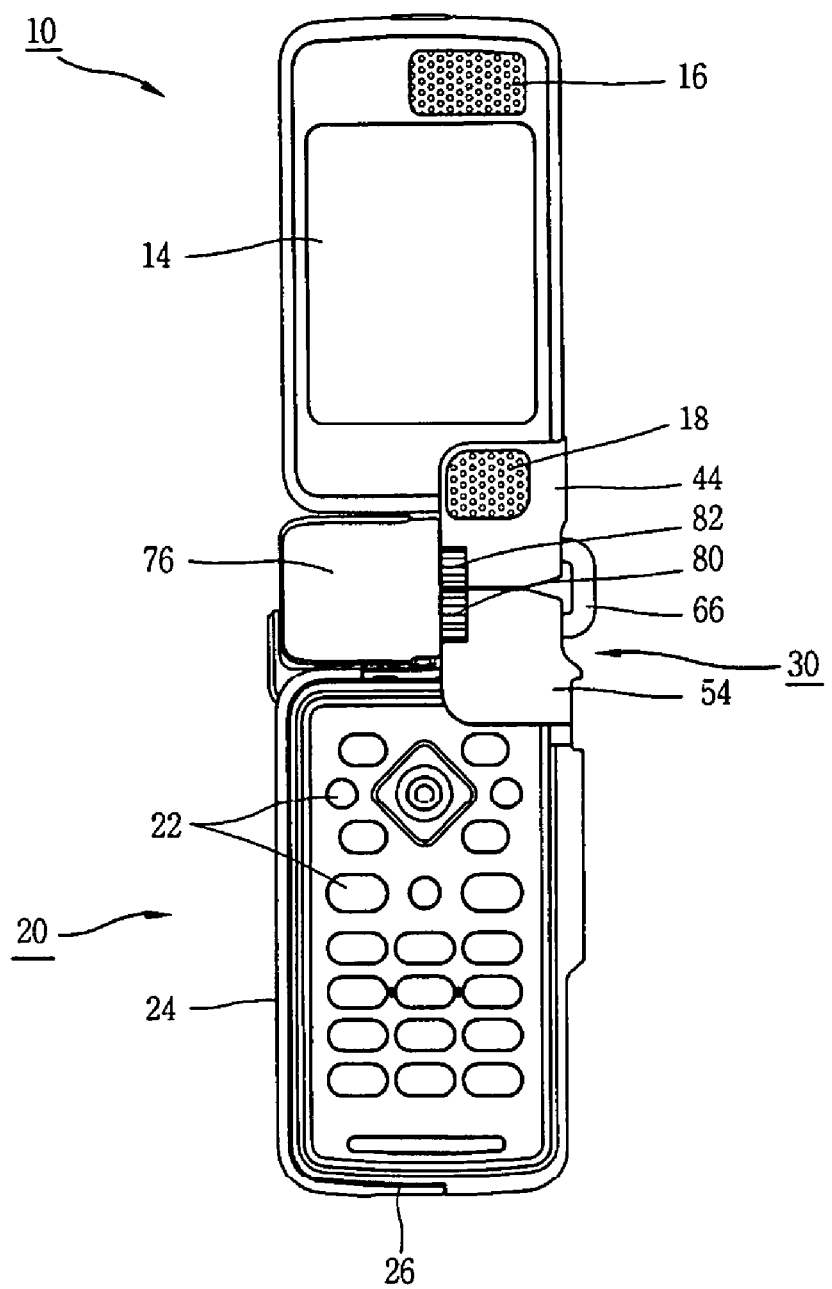
FIG. 6 is a view showing an operation state when the mobile terminal is used as a communication mode in accordance with the one embodiment of the present invention.
Figure 7:
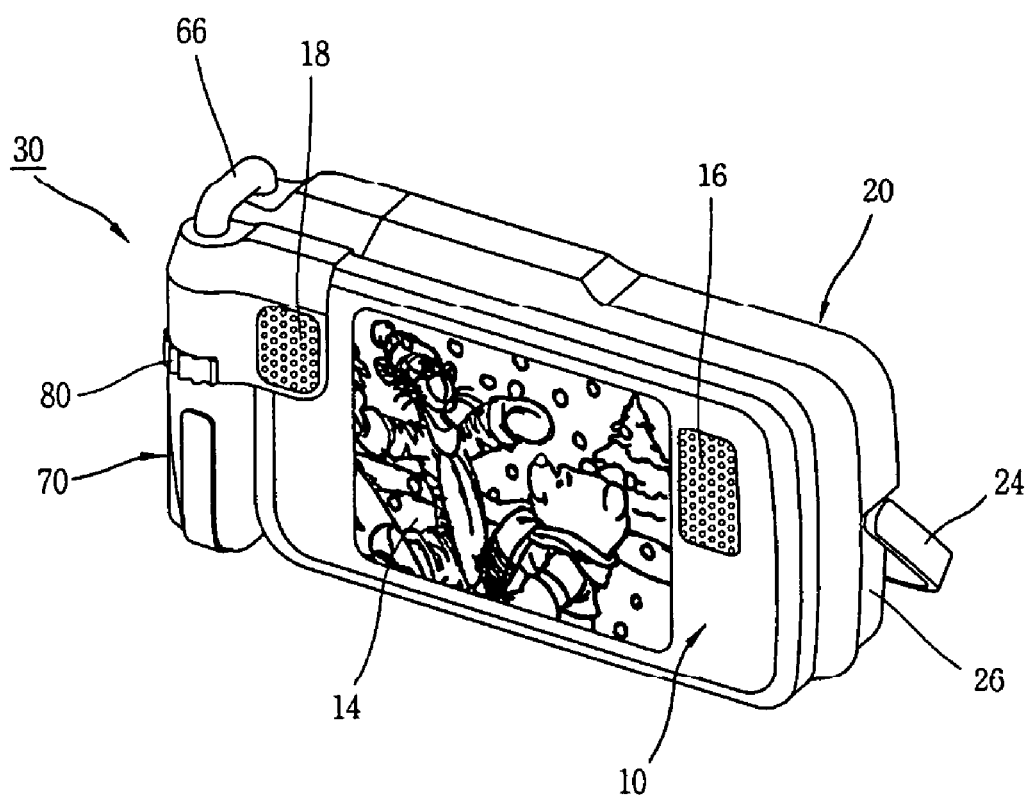
FIG. 7 is a view showing an operation state when the mobile terminal is used as a reception mode for video or satellite broadcasting in accordance with the one embodiment of the present invention.

FIG. 2 is a perspective view showing a mobile terminal in accordance with an embodiment of the present invention; FIG. 3 is a lateral view showing one side of the mobile terminal in accordance with the one embodiment of the present invention; FIG. 4 is a lateral view showing another side of the mobile terminal in accordance with the one embodiment of the present invention; FIG. 5 is a view showing an upper surface of the mobile terminal in accordance with the one embodiment of the present invention; FIG. 6 is a view showing an operation state when the mobile terminal is used as a communication mode in accordance with the one embodiment of the present invention; and FIG. 7 is a view showing an operation state when the mobile terminal is used as a video viewing mode in accordance with the one embodiment of the present invention.

A mobile terminal in accordance with an embodiment of the present invention may comprise a first body 10 having displays 12 and 14 for displaying information, a second body 20 having a key pad 22 for inputting information, and a hinge unit 30 connecting the first body 10 to the second body 20 so that the first and second bodies can be rotated by approximately 360°.

An auxiliary display 12 may be disposed at an outer surface of the first body 10, and a main display 14 may be disposed at an inner surface thereof. A pair of speakers 16 and 18 may be disposed at the inner surface of the first body 10 to thus generate sounds when viewing videos through the main display 14 or when listening to music.

The pair of speakers 16 and 18 may be disposed, respectively, at both sides of the inner surface of the first body 10 in its longitudinal direction. That is, one speaker may be disposed at one lateral surface of the main display 14 and the other speaker 18 may be disposed at the other lateral surface of the main display 14.

The pair of speakers 16 and 18, as shown in FIG. 6, may be disposed at the right side of the first body 10, because the positions of the pair of speakers 16 and 18 must continuously be higher than a bottom surface when the terminal is horizontally disposed in order to view videos and satellite broadcasting Thus, the pair of speakers 16 and 18 according to the present invention may be disposed at both the edges of the first body in its longitudinal direction with an interval therebetween, and thus allow an implementing of three dimensional stereophony. The speakers may be disposed at the right side of the first body 10 such that the positions of the speakers 16 and 18 are higher than the bottom surface upon viewing videos in a state in which the terminal is horizontally laid.

A support lever 24 (e.g., stand, easel, etc.) may be rotatably installed at the second body 20 so as to maintain the state in which the main display 14 disposed in the first body 10 is horizontally laid upon viewing videos and satellite broadcasting using the terminal, and an accommodation groove 26 may be formed at an outer lateral surface of the second body 20 to accommodate the support lever 24.

Both ends of the support lever 24 may have a perpendicularly curved shape. A hinge pin 28 may be formed at one end of the support lever 24 and thus inserted into a hinge groove formed at one lateral surface of the second body 20. The other end of the support lever 24 may be mounted in the hinge unit 30.

Here, a locking unit may be disposed between the other end of the support lever 24 and the hinge unit 30 so as to restrain a rotating of the hinge unit 30 when the support lever 24 is rotated to a support position for supporting the terminal to be continuously laid in its horizontal direction.

When the support lever 24 is rotated to view the video or the satellite broadcasting using the terminal, the support lever 24 is separated from the accommodation groove 26, and then supported at the bottom surface, and thus the terminal is maintained in the state of being horizontally laid. At this time, the locking unit is driven to lock the hinge unit 30 so that the hinge unit 30 can not be rotated.

When using the mobile terminal as the typical communication mode, the support lever 24 is accommodated in the accommodation groove 26 at the second body 20. At this time, the hinge unit 30 is unlocked.

One end of the support lever 24 may be electrically connected to a printed circuit board (not shown) mounted in the second body 20, and thus the support lever 24 may also be used as an antenna for transmitting and receiving signals. That is, when the antenna is installed within the support lever 24 and then electrically connected to the printed circuit board, the support lever 24 can be utilized as an external antenna in addition to the function of supporting the terminal.

Figure 8:
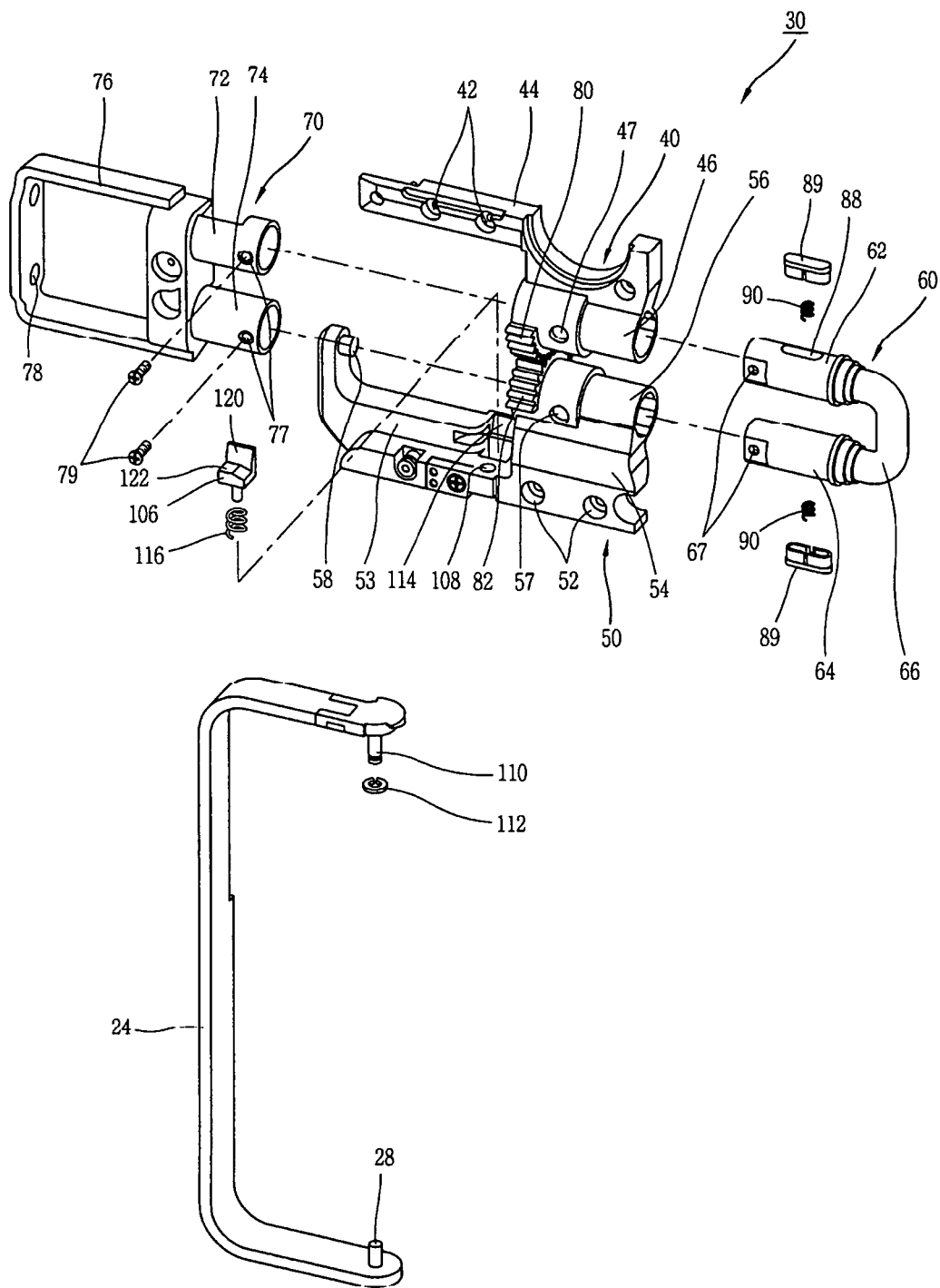
FIG. 8 is an exploded perspective view showing a hinge unit in accordance with the one embodiment of the present invention.
Figure 9:
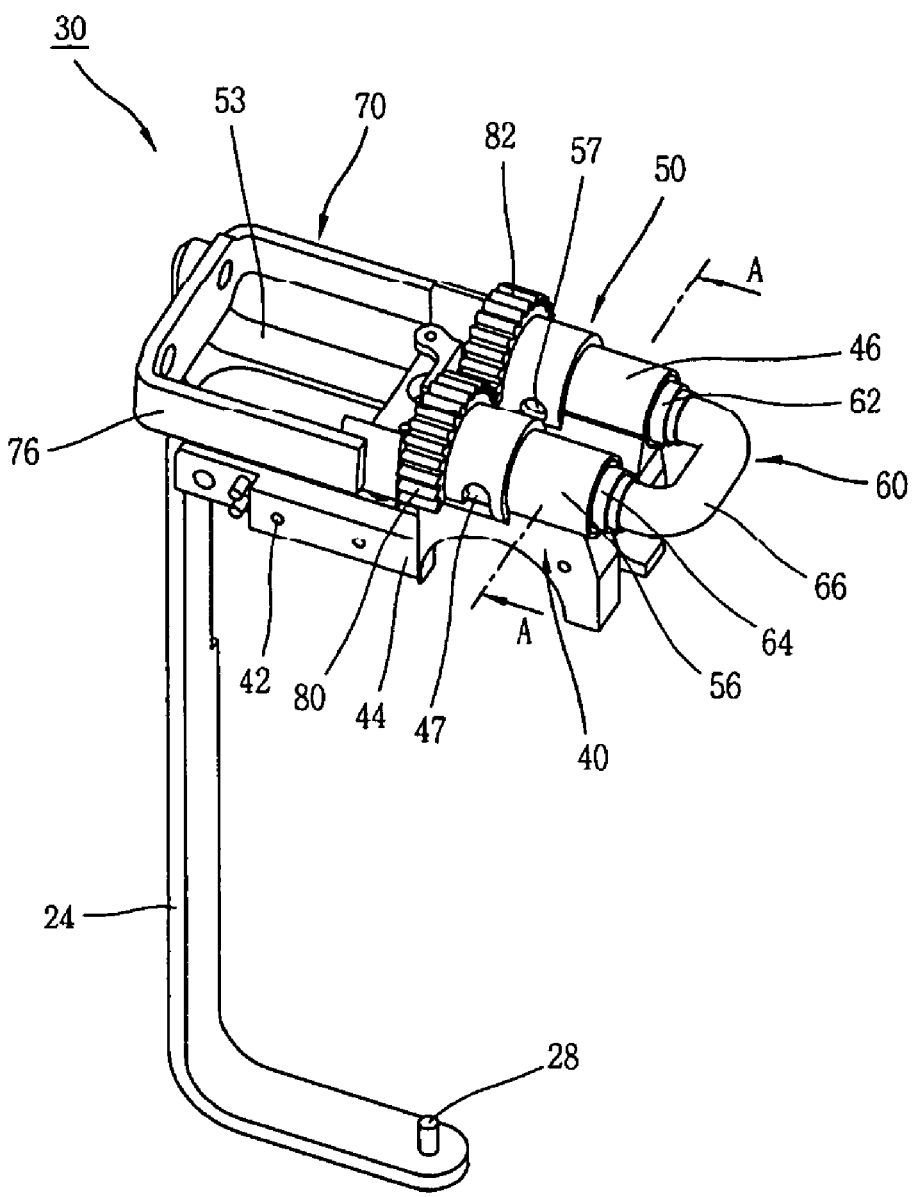
FIGS. 9 to 12 are perspective views showing the hinge unit in accordance with the one embodiment of the present invention.
Figure 10:
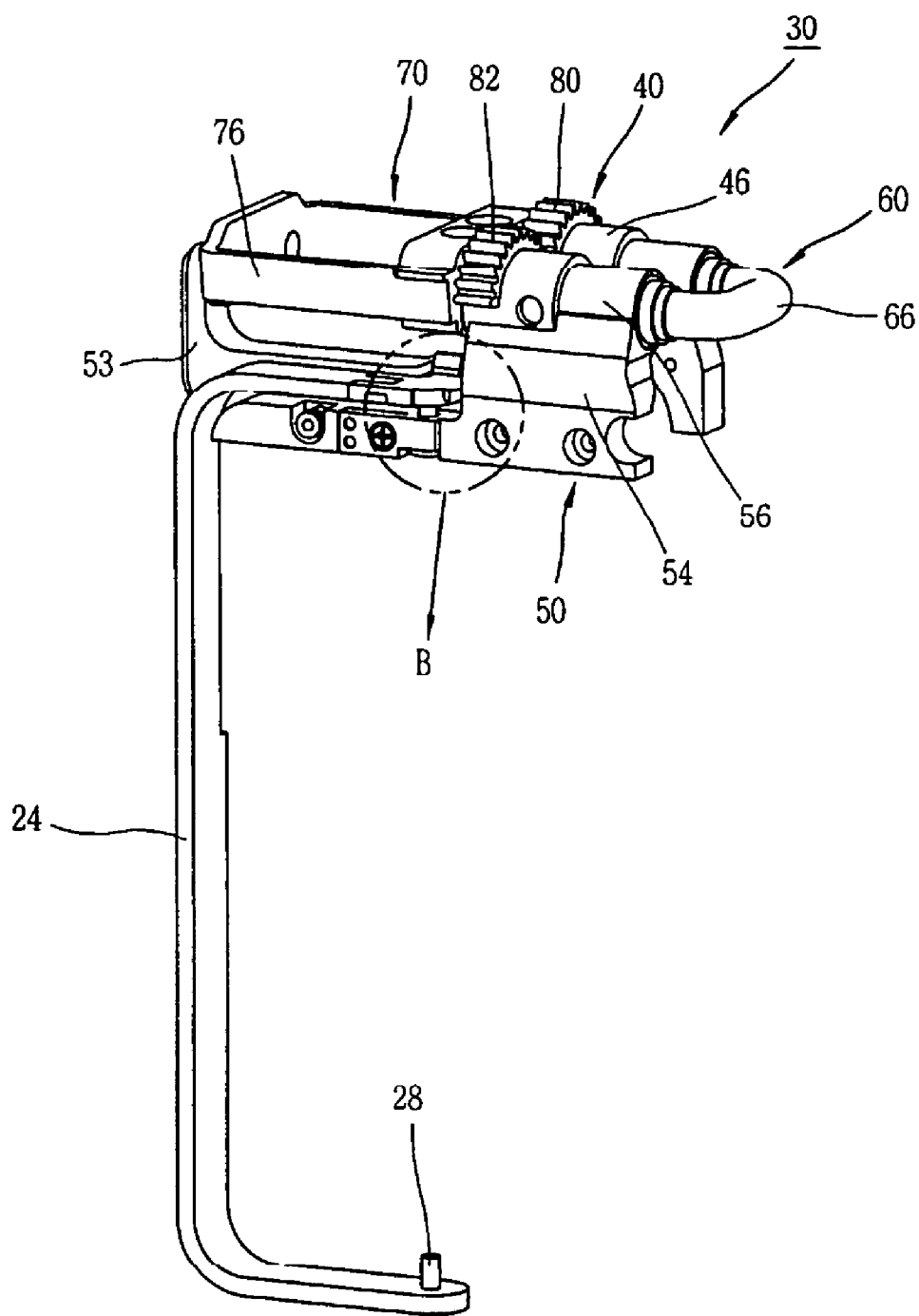
Figure 11:
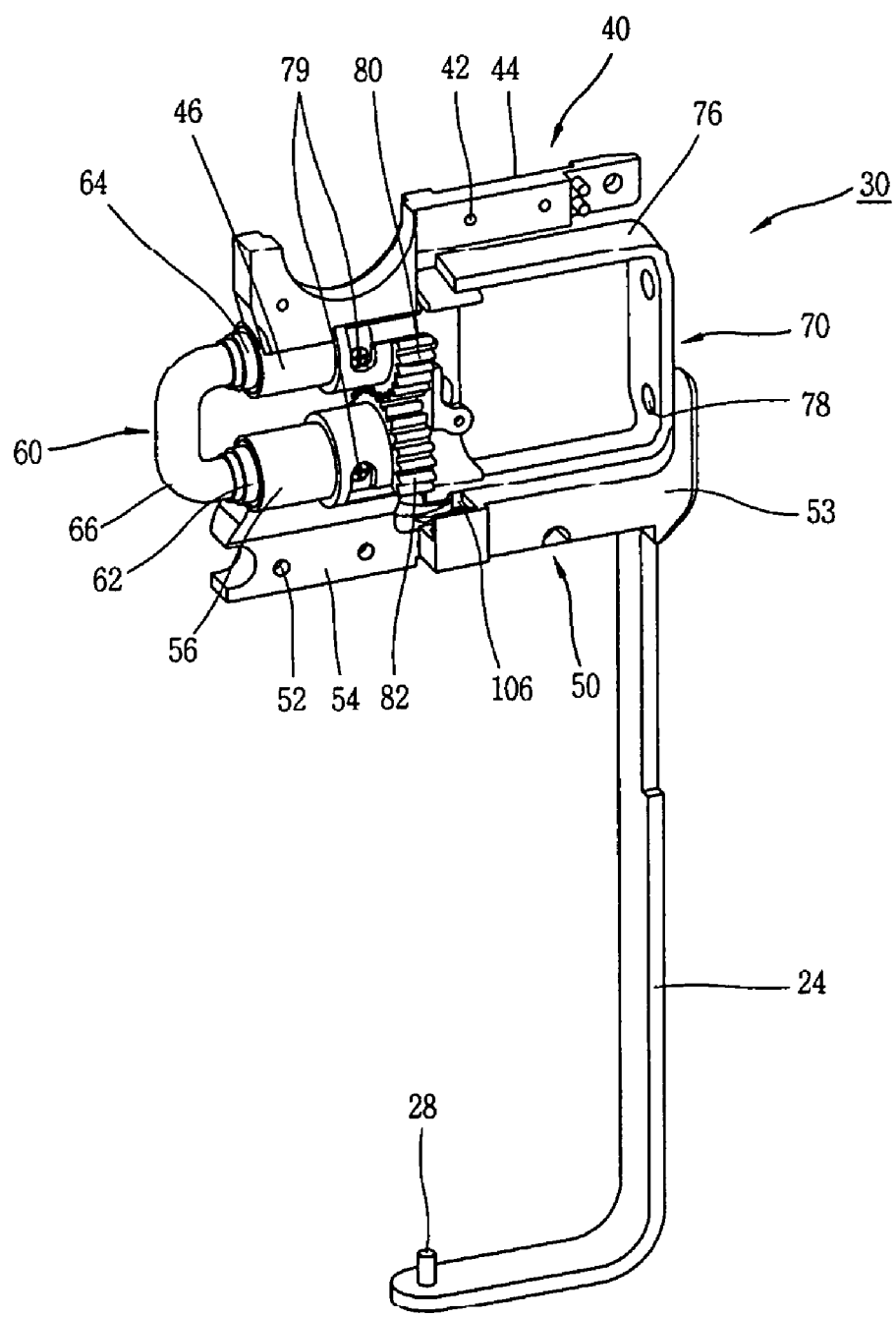
Figure 12:
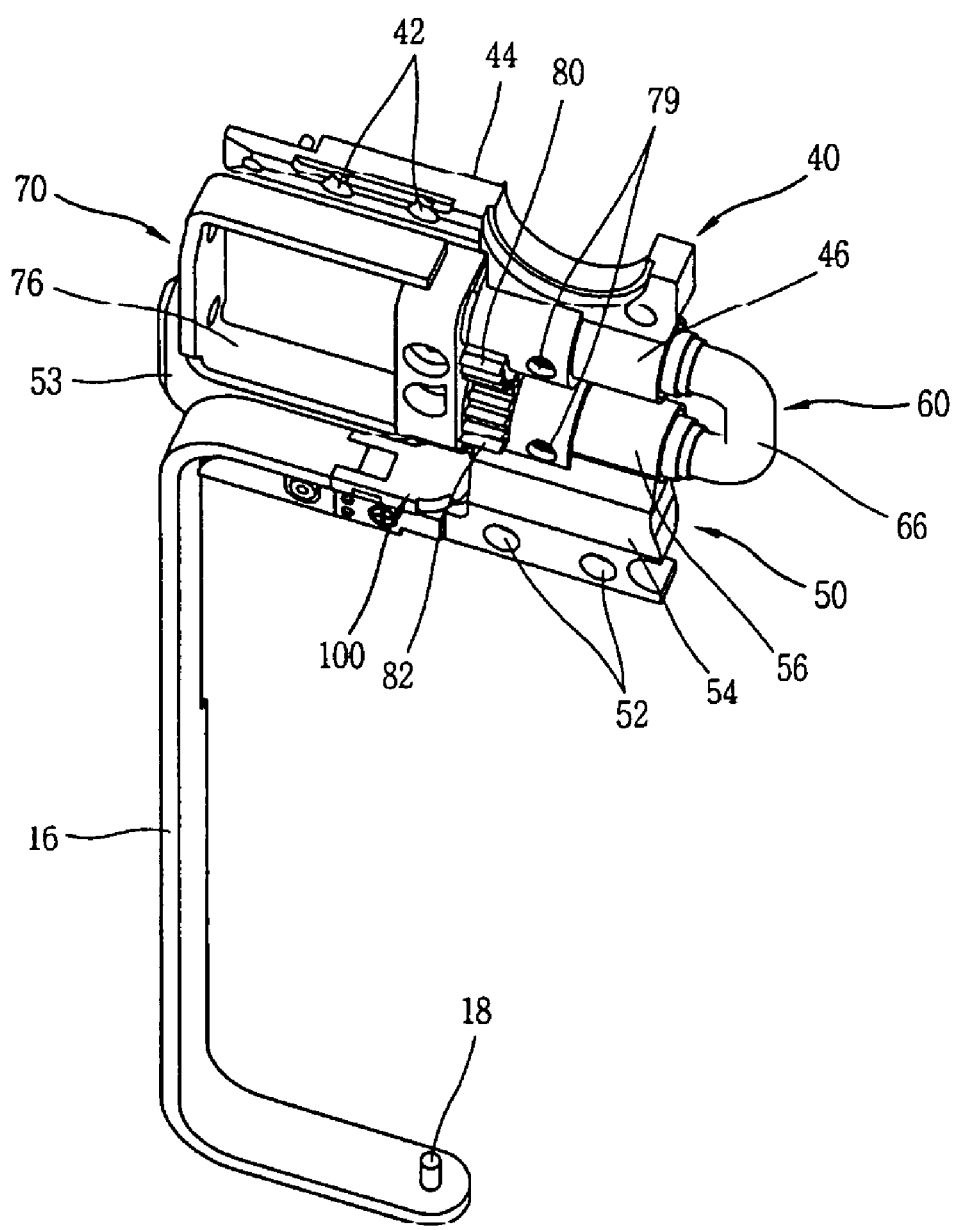

FIG. 8 is an exploded perspective view showing a hinge unit according to the present invention, FIGS. 9 and 10 are perspective views showing the hinge unit according to the present invention, and FIGS. 11 and 12 are perspective views showing a state in which the hinge unit is rotated.

The hinge units 30 may include a first hinge unit 40 attached with the first body 10, a second hinge unit 50 attached with the second body 20, and may be relatively rotated by being engaged with the first hinge unit 40, and connection units 60 and 70 connected between the first hinge unit 40 and the second hinge unit 50, to allow the first hinge unit 40 and the second hinge unit 50 to be rotatable by approximately 360°.

The first hinge unit 40 may include a first coupling bracket 44 having a plurality of bolt coupling holes 42 therein, used for coupling with the first body 10 by a connector (e.g., bolt), and a first hinge portion 46 integrally formed at the first coupling bracket 44, and rotatably hinge-connected to the connection units 60 and 70.

The second hinge unit 50 may include a second coupling bracket 54 having a plurality of bolt coupling holes 52 therein, used for coupling with the second body 20 by a connector (e.g., bolt), and a second hinge portion integrally formed at the second coupling bracket 54, and rotatably hinge-connected to the connection units 60 and 70.

A first gear 80 may be formed at an outer circumferential surface of the first hinge portion 46 in its circumferential direction, and a second gear 82 may be formed at an outer circumferential surface of the second hinge portion 56 to thus be engaged with the first gear 80. Here, because the first gear 80 is engaged with the second gear 82, it can be said that the first hinge unit 40 and the second hinge unit 50 always have the same rotation angle magnitude, but rotate in opposite directions.

That is, if the first hinge unit 40 rotates by 45°, for instance, the second hinge unit 50 also rotates by 45°. Alternatively, if the second hinge unit 50 is considered to be fixed, then the first hinge unit 40 would effectively rotate 90°. Namely, the angle formed between the first and second hinge units 40 and 50 can thus be 90°. This can be understood by the first and second hinge units 40 and 50 being engaged with each other.

The connection units 60 and 70 may include the first connection unit 60 inserted into one end of the first hinge portion 46 and the second hinge portion 56, respectively, and the second connection unit 70 inserted into the other sides of the first hinge portion 46 and the second hinge portion 56, and coupled to the first connection unit 60.

The first connection unit 60 may include a first rod 62 inserted into one side of the first hinge portion 46 to rotatably support the first hinge portion 46, a second rod 64 inserted into one side of the second hinge portion 56 to rotatably support the second hinge portion 56, and a connection rod 66 for connecting the first rod 62 to the second rod 64. The connection rod 66 having a shape of 'U' of which one end is fixed to the first rod 62 and another end is fixed to the second rod 64.

The second connection unit 70 may include a first rod coupling portion 72 inserted into the other side of the first hinge portion 46 and formed in a cylindrical shape to thus allow the first rod 62 to be insertedly coupled thereto, a second rod coupling portion 74 inserted at the other side of the second hinge portion 56 and formed in a cylindrical shape to thus allow the second rod 74 to be insertedly coupled thereto, and a frame 76 to which the first and second rod coupling portions 72 and 74 are fixed.

Here, the frame 76 can be utilized as a mounting portion in which a camera 68 (or other component) may be mounted. That is, the frame 76 may have a rectangular shape, to thus allow a camera 68 to be fixed therein. The first rod coupling portion 72 and the second rod coupling portion 74 may be fixed to one lateral surface of the frame 76.

A hinge hole 78 may be formed at the frame 76 such that a hinge pin 58 formed at a support portion 53 extending from the second coupling bracket 54 of the second hinge unit 50 is inserted therein to thus rotatably support the second hinge unit 50. That is, the second hinge unit 50 is rotatably supported at the frame 76 by the support portion 53 to thus be rotated more securely.

Bolt coupling holes 67 are formed at end portions of the first rod 62 and the second rod 64, respectively. Bolt holes 77 are formed at end portions of the first rod coupling portion 72 and the second rod coupling portion 74, respectively. The first rod 62 is inserted into the first rod coupling portion 72 to thereafter be coupled thereto by a bolt 79, and the second rod 64 is inserted into the second rod coupling portion 74 to thereafter be coupled thereto by the bolt 79.

Bolt passages 47 and 57 are formed at the first hinge portion 46 and the second hinge portion 56, respectively, such that the bolt 79 passes therethrough to couple the first rod 62 to the first rod coupling portion 72 and couple the second rod 64 to the second rod coupling portion 74.

Figure 13:
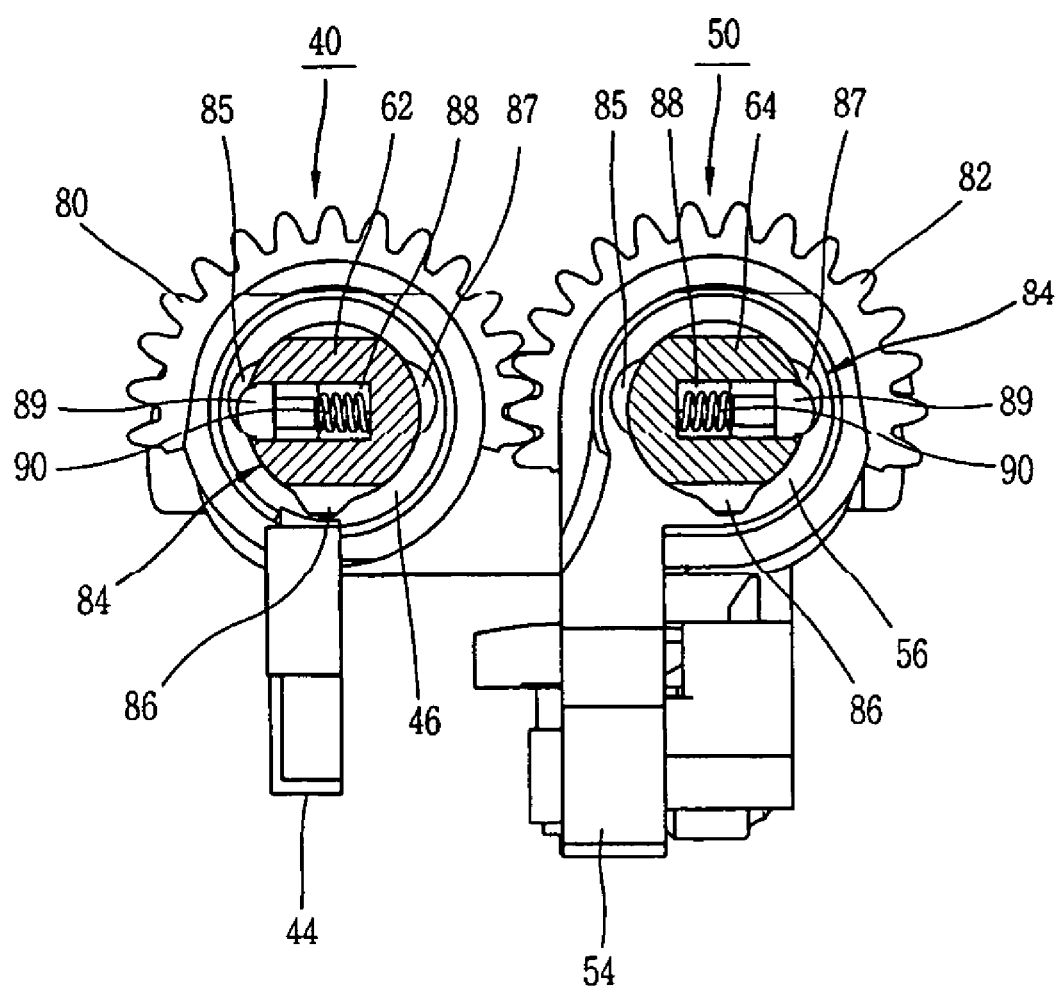
FIG. 13 is a sectional view taken along the line A-A of FIG. 9.
Figure 14:
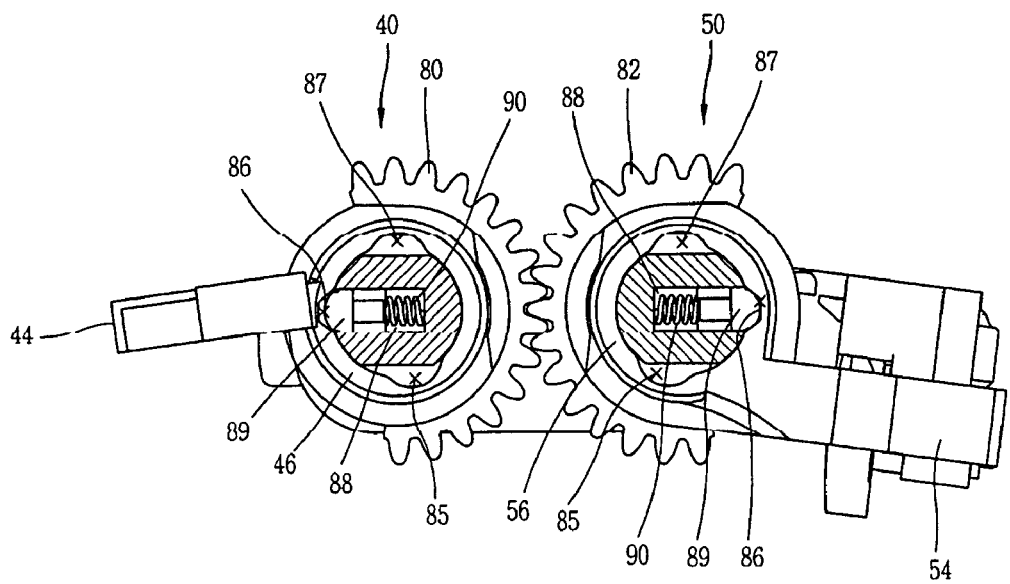
FIG. 14 is a view showing an operation state of a position fixing unit in accordance with the one embodiment of the present invention.

As shown in FIGS. 13 and 14, a position fixing unit 84 may be disposed, respectively, between an inner circumferential surface of the first hinge portion 46 and an outer circumferential surface of the first rod 62 and between an inner circumferential surface of the second hinge portion 56 and an outer circumferential surface of the second rod 64, to thus fix each rotated position of the first and second body 10 and 20, respectively, when the two bodies 10 and 20 are relatively rotated.

The position fixing unit 84 may include grooves 85, 86 and 87 formed, respectively, at the inner circumferential surface of the first hinge portion 46 and the inner circumferential surface of the second hinge portion 56 with a constant interval, a support rod 89 inserted to be linearly movable into an insertion groove 88 which is formed, respectively, at the outer circumferential surfaces of the first rod 62 and the second rod 64 in a radius direction thereof, each support rod being inserted into one of the grooves 85, 86 and 87 at each hinge portion 46 and 56, and a spring 90 disposed between a lower surface of the support rod 89 and a bottom surface of the insertion groove 88 to apply an elastic force to the support rod 89. The grooves 85, 86 and 87 may include the first groove 85 having a concave hemispherical shape and in which the support rod is inserted so as to keep the first and second bodies 10 and 20 in a folded (closed) state when the first and second bodies 10 and 20 are folded together, the second groove 86 in which the support rod is inserted so as to maintain a current opened angle upon performing the communication function by opening the first body 10 and the second body 20 by an angle less than 90° therebetween (namely, an angle of 180° or less between the first and second bodies 10, 20), and the third groove 87 in which the support rod 89 is inserted when the first body 10 and the second body 20 are flipped (rotated) by 360° to expose the main display 14 to the exterior upon viewing the video or satellite broadcasting using the terminal.

Here, an angle between the first groove 85 and the second groove 86 is preferably about 82.5°, and an angle between the first groove 85 and the third groove 87 is preferably about 180°.

Here, the first hinge unit 40 and the second hinge unit 50 are engaged with each other by the first gear 80 and the second gear 82 so as to have the same rotation angle. Therefore, the total angle between the first body 10 and the second body 20 can be obtained by adding the rotation angle of the first hinge unit 40 to that of the second hinge unit 50.

Hence, when the terminal is used to perform a certain type of communication function (i.e., held next to the user's ear for a typical voice call), an internal angle between the first body 10 and the second body 20 is approximately 165°. When the terminal is used for viewing videos or satellite broadcasting (e.g., S-DMB, T-DMB, DVB-H, etc.), the rotation angle between the first body 10 and the second body 20 is 360°. Namely the first body 10 can be completed flipped over the second body 20 to fully expose a large (or main) display screen 14.

The support rod 89 is inserted in the insertion groove 88 in its radius direction to thus enable a linear moving. One end of the support rod 89 is formed in a hemispherical shape to be inserted into the grooves, and the spring 90 is mounted in the other end thereof.

A locking unit 100 is disposed between the support lever 24 and the hinge unit 30 such that the hinge unit 30 is locked so as not to be rotated when the terminal is supported by the support lever 24.

Figure 15:
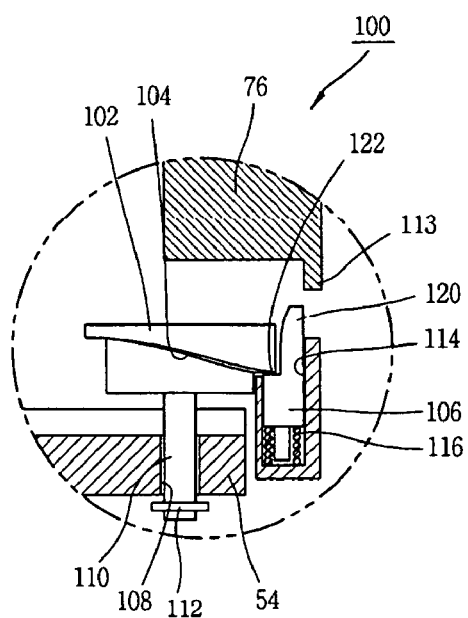
FIG. 15 is an enlarged view of a part B of FIG. 10.
Figure 16:
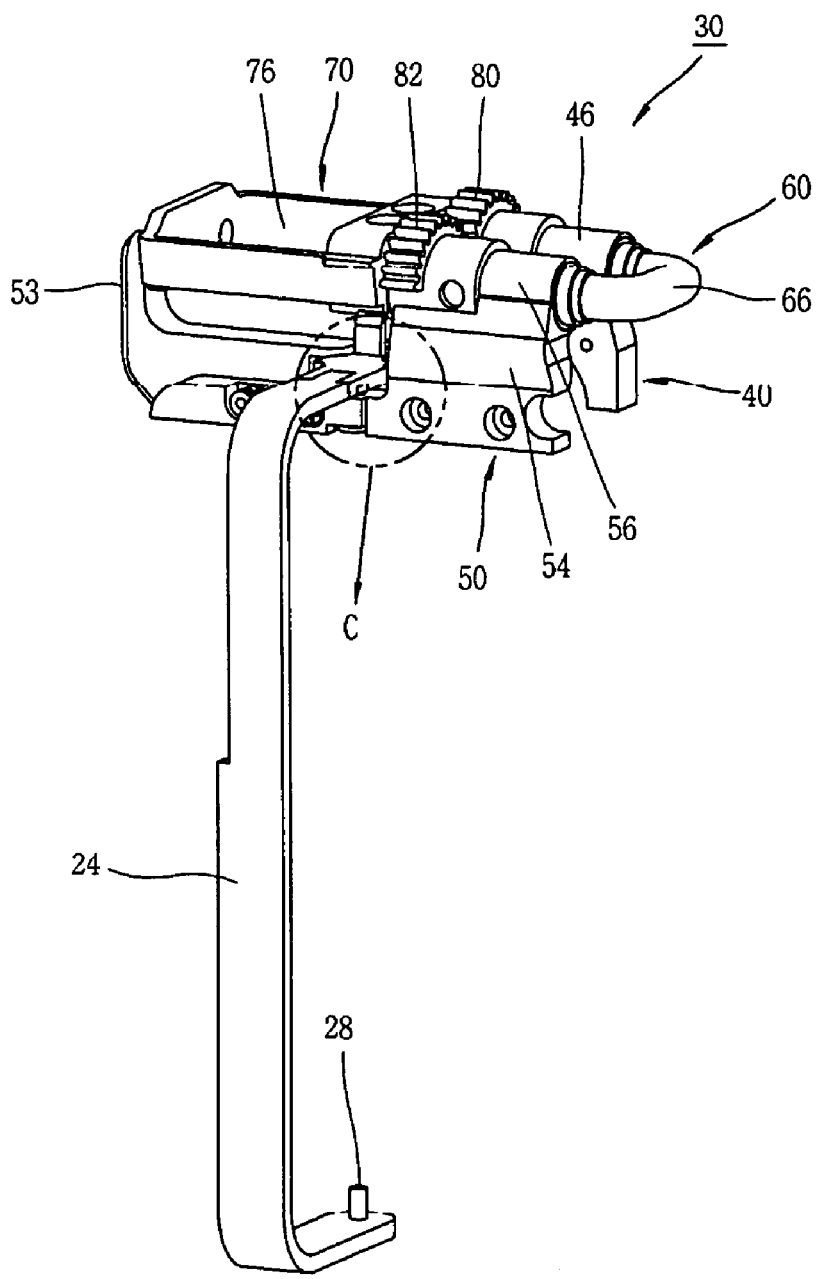
FIG. 16 is a perspective view showing a hinge unit indicating a locking unit in accordance with the one embodiment of the present invention.
Figure 17:
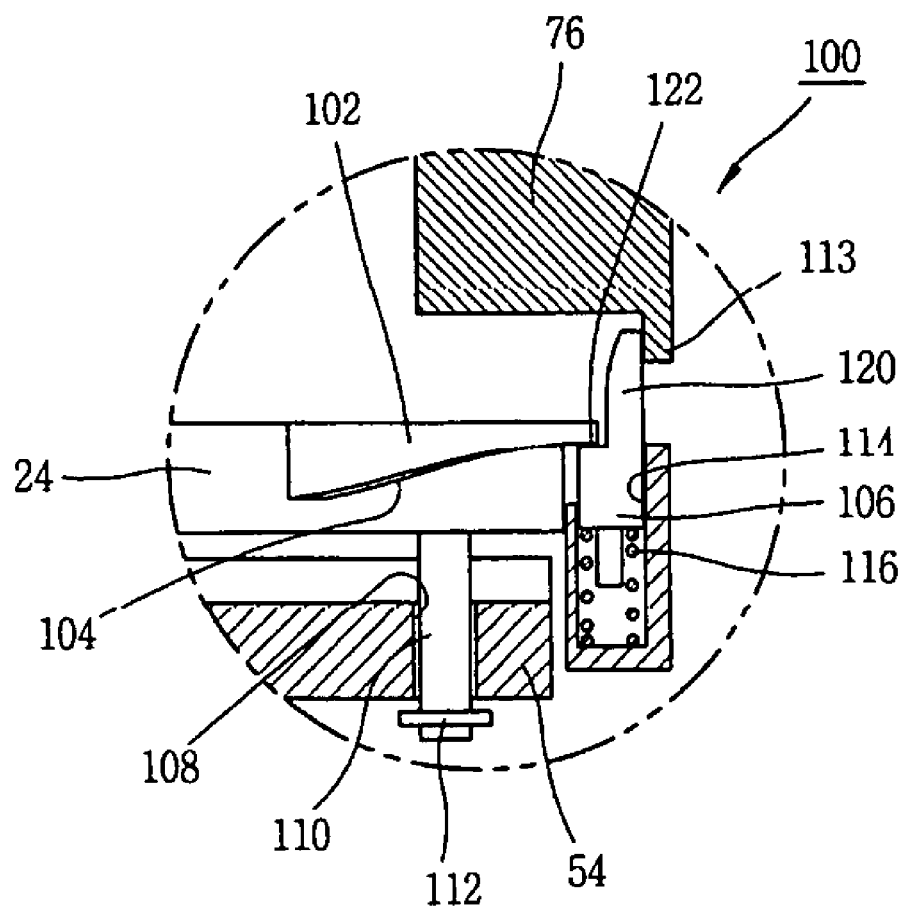
FIG. 17 is an enlarged view of a part C of FIG. 16.

The locking unit 100, as shown in FIGS. 15 to 17, may include a cam portion 102 formed at an end portion of the support lever 24, a locking rod 106 disposed in a state of being in contact with the cam portion 102, and moving in a vertical direction along a cam surface 104 in response to the rotation of the support lever 24, and a locking protrusion 113 formed at the frame of the second connection unit 70, and locking the hinge unit 30 so as not to be rotated when the locking rod 106 is caught by the locking protrusion 113.

A hinge rod 110 is formed at the end portion of the support lever 24 to be rotatably inserted into a hinge hole 108 formed at the second coupling bracket 54. The hinge rod 110 is provided with a separation preventing washer 112 in order to prevent the hinge rod 110 from being separated from the hinge hole 108.

The cam portion 102 having the cam surface 104 is formed at the end portion of the support lever 24.

The locking rod 106 is mounted in a guide groove 114 formed at the second coupling bracket 54 to thus be movable in a vertical direction. A spring 116 is mounted between the lower surface of the locking rod 106 and the guide groove 114 to thus apply an elastic force by which the locking rod 106 moves in its upper direction.

The locking rod 106 is provided with a stopping portion 120 formed at an upper portion of the locking rod 106 and caught at the locking protrusion 113, and a contact portion 122 formed to be lower as compared to the stopping portion 120, and thus being in contact with the cam surface 104 of the cam portion 102 to slidably move along the cam surface 104.

The locking protrusion 113 protrudes downwardly from the frame 76 of the second connection unit 70. When the locking protrusion 113 is caught at the locking rod 106, the second hinge unit 50 is restrained from being rotated.

An operation of the locking unit 100 will now be explained. As shown in FIG. 15, when the support lever 24 is accommodated within the accommodation groove 26 formed at the second body 20, the contact portion 122 of the locking rod 106 is in contact with the cam surface 104 at a thick portion of the cam portion 102. Accordingly, the locking rod 106 is positioned in a state of being descended, and thus the stopping portion 120 of the locking rod 106 is separated from the locking protrusion 113, to thus allow a rotating of the hinge unit 30.

When the support lever 24 is separated (pulled out) from the accommodation groove 26 and rotated (to be used as a support for the terminal), as shown in FIGS. 16 and 17, the contact portion 122 of the locking rod 106 is in contact with the cam surface 104 at a thin portion of the cam portion 102. Accordingly, the locking rod 106 is ascended. Then, the stopping portion 120 of the locking rod 106 is caught at the locking protrusion 113 formed at the frame 76 of the second connection unit 70, to thus lock the second hinge unit 50. The second hinge unit 50 is restrained from being rotated. The first hinge unit 40 is also engaged with the second hinge unit 50 by the gears so as not to be rotated.

An operation of the hinge unit 30 according to the present invention which is constructed and operated as aforementioned will now be explained.

First, while the terminal is folded, the support rod 89 is inserted into the first groove 85 formed at the first and second hinge portions 45 and 56, and the elastic force of the spring 90 maintains the state of the support rod 29 being inserted in the first groove 85. Accordingly, the first body 10 and the second body 20 maintains its folded (closed) state.

When the first body 10 is opened (unfolded) by the user to use the terminal in a certain communication mode, the opened position of the first body 10 may be maintained as shown in FIG. 6. That is, the support rod 89 is separated from the first groove 85 (due to the force exerted by the user upon opening or unfolding the first body 10 or due to some other mechanism the performs or assists this opening procedure) and thereafter inserted in the second groove 86. Accordingly, the opened angle between the first body 10 and the second body 20 may be maintained at less than 180°, namely, about 165°.

At this time, the first hinge unit 40 and the second hinge unit 50 are engaged with each other by the first gear 80 and the second gear 82, and thus have the same rotation angle. Therefore, the first hinge unit 40 is rotated by about 82.5°, and the second hinge unit 50 is also rotated by an angle of about 82.5. As a result, the angle between the first body 10 and the second body 20 may be about 165°.

Upon using the terminal as the viewing mode for videos or satellite broadcasting, as shown in FIG. 7, when the first body 10 is rotated relatively more than the second body 20, the first body 10 may come into contact with a rear surface of the second body 20, and the main display 14 mounted in the first body 10 is fully exposed.

Here, it can be understood that the first body 10 being fully exposed may be held in place bay various means. For example, the hinge units 40, 50 may have a structure to allow the first body 10 to be temporarily locked in place at certain angles from the second body. Alternatively, the support rod 89 may be inserted into the third groove 87 upon being separated from the second groove 86, and accordingly a state in which the first and second body 10 and 20 being rotated by about 360° may be maintained. In order to maintain a state in which the terminal is laid in its horizontal direction, the support lever 24 may be separated from the accommodation groove 26 and supported at the ground surface. Thereafter, the satellite broadcasting can be viewed through the main display 14 while the state of the terminal being laid in its horizontal direction is maintained. At this time, the speakers 16 and 18 are disposed at both lateral surfaces of the first body 10 to thus implement a three dimensional stereophony.

When rotating the support lever 24 as aforementioned, the locking unit 100 may be driven to restrain the hinge unit 30 from being rotated.

Figure 18:
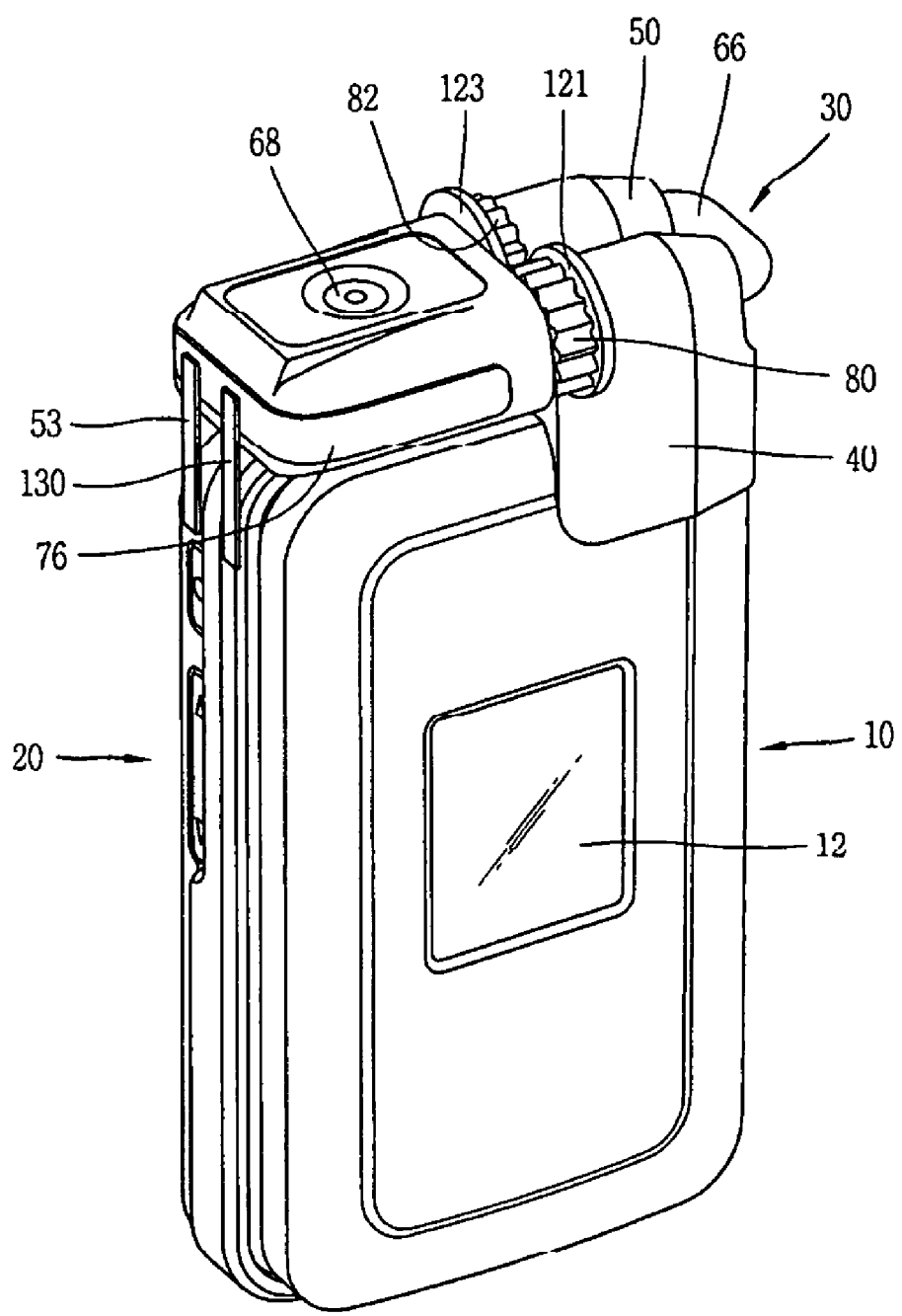
FIG. 18 is a perspective view showing a mobile terminal in accordance with a second embodiment of the present invention.
Figure 19:
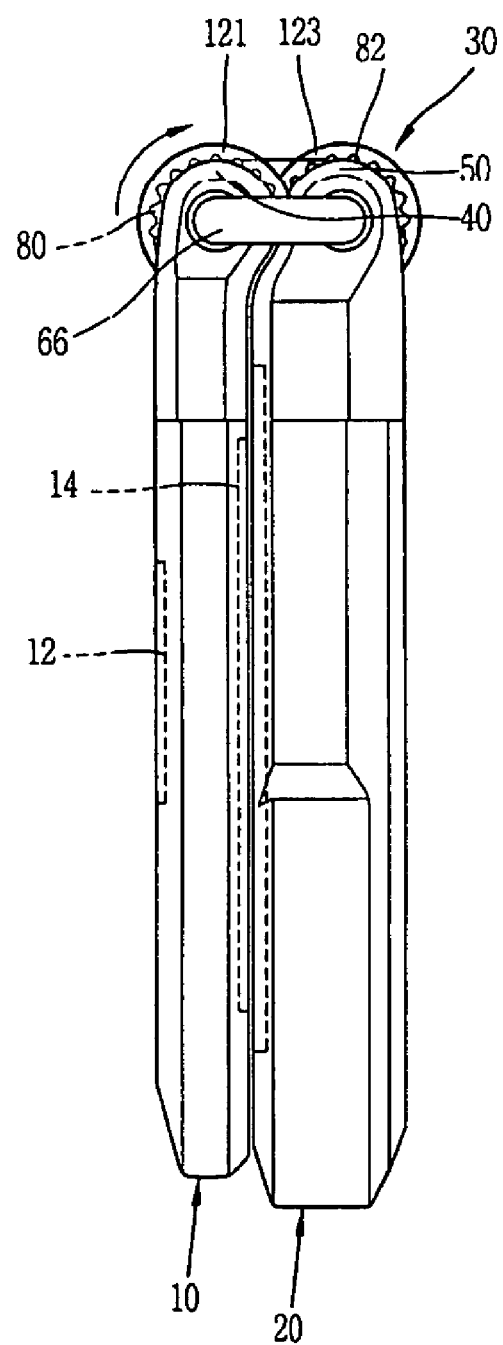
FIG. 19 is a sectional view showing the mobile terminal in accordance with a second embodiment of the present invention.
Figure 20:
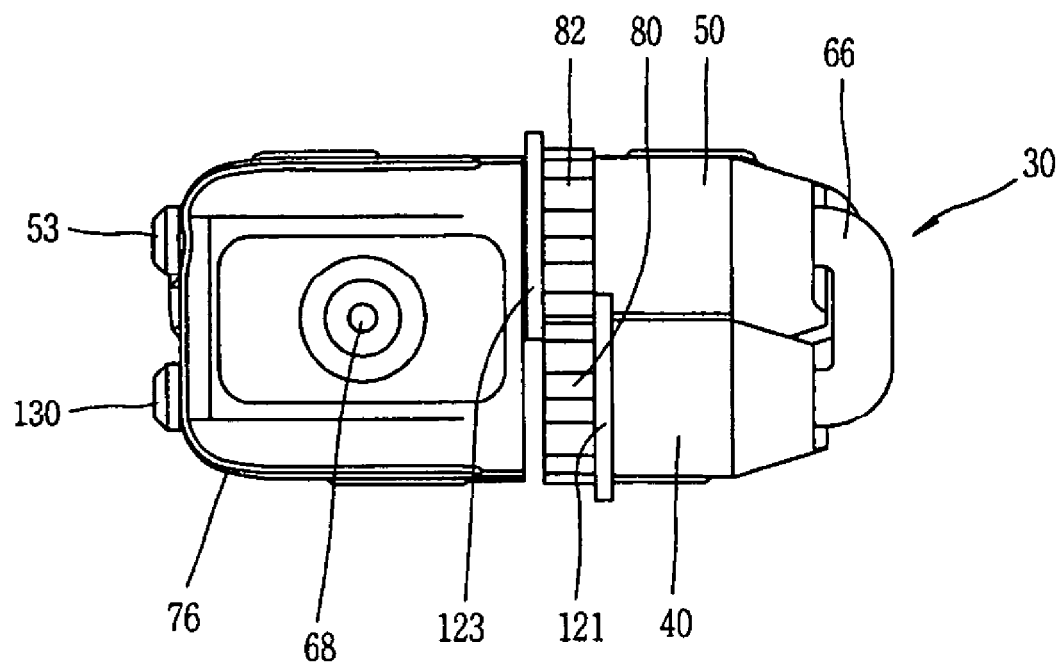
FIG. 20 is a top view showing the mobile terminal in accordance with a second embodiment of the present invention.

FIG. 18 is a perspective view showing a mobile terminal in accordance with a second embodiment of the present invention, FIG. 19 is a sectional view showing the mobile terminal in accordance with a second embodiment of the present invention, and FIG. 20 is a top view showing the mobile terminal in accordance with a second embodiment of the present invention.

A mobile terminal in accordance with a second embodiment of the present invention may have the same or similar construction as that of the mobile terminal according to the first embodiment. However, protective portions (e.g., 121, 123) are formed at the first gear 80 at the first hinge unit 40 and the second gear 82 at the second hinge unit 50 for preventing undesirable objects from being caught thereat.

The protective portions may include a first prevention board 121 formed at a lateral surface of the first gear 80 and having a diameter greater than that of the first gear 80, and a second prevention board 123 formed at a lateral surface of the second gear 82 and having a diameter greater than that of the second gear 82.

Here, the first and second prevention boards 121 and 122 are disposed to face each other. That is, when the mobile terminal is viewed from the perspective of FIG. 20, the first prevention board 121 is formed at a left lateral surface of the first gear 80, while the second prevention board 123 is formed at a right lateral surface of the second gear 82.

The first and second prevention boards 121 and 123 may be disposed at the first and second gears 80 and 82, respectively, to thus be relatively rotated each other, the first and second prevention boards 121 and 123 being formed in circular boards which are separate from the first and second gears 80 and 82. Also, the first and second prevention boards 121 and 123 may be integrally formed at the lateral surface of the first and second gears 80 and 82.

According to the second embodiment of the present invention, the protective portions 121 and 123 are formed at the lateral surfaces of the first gear 80 and the second gear 82 to have the diameters greater than those of the first gear 80 and the second gear 82. Accordingly, when the first gear 80 and the second gear 82 are rotated in a state of being engaged with each other, undesired objects can be prevented from being caught between the first gear 80 and the second gear 82, thereby improving stability and reliability.

The mobile terminal according to the second embodiment may be provided with a support rod 130 disposed between the first body 10 and the hinge unit 30 to rotatably support the first body 10, to thus improve stability.

That is, the support rod 130 has a particular length. One end of the support rod 130 is rotatably supported at the frame 76 of the second connection unit 70, and the other end is fixed to the lateral surface of the first body 10. Therefore, when the first body 10 is rotated centered on the hinge unit 30, the support rod 130 can support the first body 10 in order to allow the first body 10 to be rotated more stably.

In the mobile terminal according to the present invention having such construction and performing such operations, the first body can be allowed to be rotated (flipped) by about 360° with respect to the second body, and accordingly the viewing of videos and satellite broadcasting can be more convenient.

Also, the support lever is rotatably disposed at the second body to maintain the state of the terminal being horizontally laid, and thus the viewing of the videos and satellite broadcasting can be more convenient.

In addition, the opened positions of the first body and the second body can be fixed with various angles, and thus the mobile terminal can be used more conveniently.

The various features of the present invention may be further described and explained in the following manner. Note that the element reference numbers have not been specified, but may be clearly understood upon viewing the drawings and this overall disclosure.

The present invention provides an electronic device comprising: a first body; a second body; and a hinge frame operatively connecting the first body with the second body, the hinge frame comprising, a dual-axis hinge having a first cylinder unit and a second cylinder unit configured such that an axis of rotation of the first cylinder is parallel and adjacent to but not coinciding with an axis of rotation of the second cylinder, the first cylinder unit allowing the first body to be attached thereto, and having a first end and a second end; the second cylinder unit allowing the second body to be attached thereto, and having a first end and a second end; a first gear formed at the first end of the first cylinder unit meshing with a second gear formed at the first end of the second cylinder unit, to allow the first and second bodies to be flipped open or closed with respect to each other at an angle of up to about 360 degrees; and a connector having two ends that are respectively connected with and allow the first and second cylinder units to rotate with respect to each other.

The first body and the second body are approximately parallel to and face towards each other in a first configuration, and the first body and the second body are approximately parallel to and face away from each other in a second configuration. The first and second bodies can form a third configuration wherein the first and second bodies are positioned such that their inner surfaces form an angle of about 180 degrees or less therebetween.

The two ends of the connector are respectively inserted into or respectively receive the second ends of the first and second cylinder units. The connector is configured to have a clearance from the dual-axis hinge to allow a strap or other item to be attached to the electronic device.

The first and second gears are relatively exposed to provide a distinctive aesthetic appearance in combination with the first and second cylinder units together with the support member. Each of the first and second gears have a protruding disk shoulder portion to minimize undesired contact with external objects while maintaining the relatively exposed distinctive aesthetic appearance. Namely, such an "exposed gears look" may provide a distinctive and unique appearance that conveys the notion of a sturdy, tough, mechanical, precision device.

The present invention may further comprise: an auxiliary support member having two ends respectively inserted into or respectively receiving the first ends of the first and second cylinder units, or an attachment module that supports the first ends of the first and second cylinder units, and also allows one or more additional elements to be attached to the hinge frame. The attachment module comprises an image capture device and/or other electrical components. The image capture device is allowed to rotate, pivot, swivel, and/or otherwise move with respect to the hinge frame. Also, there may be additional connectors respectively connecting the attachment module with the first body and with the second body. As such, different types of attachment modules may be attached according to various needs.

The present invention may further comprise a "standle". Here, the term "standle" (stand+handle) has been created for the sake of convenience to refer to an element that can operate at least as a stand and also a handle. However, this terminology is not meant to be limiting, as other terms may be used to describe such a feature, having at least one end movably attached to the second body and can be flipped out or stowed, the standle having at least two simultaneous functions of acting as a stand to support the electronic device in a leaning manner when placed on a surface, and also acting as a handle when a user carries the electronic device.

The standle has an elongated portion sufficient to accommodate carrying thereof, and has an overall shape that molds to a portion of an outer periphery of the second body to allow a flush appearance when stowed. The standle is placed in a groove or recessed portion formed along an edge of the second body when stowed. The standle has one end movably attached to the hinge frame and an opposing end movably attached to the second body. The standle has an internal antenna that allows improved reception of signals.

The first and second cylinder units have a detent mechanism to allow the first and second bodies to be temporarily held in place at certain positions. The dual-axis hinge further comprises spring biased or motorized mechanisms to facilitate the movement of the first and second bodies.

The first body, the second body, or both have at least one cushion means to provide a cushion between surfaces of the first and second bodies, when the first and second bodies are approximately parallel to and face towards each other in a first configuration, and when the first and second bodies are approximately parallel to and face away from each other in a second configuration.

The first body, the second body, or both have at least one display unit thereon. The first body, the second body, or both have at least one touch screen thereon that functions as both a display device and an input device.

Furthermore, the present invention provides a hinge mechanism for an electronic device, comprising: a first tube unit having a first axis of rotation and allowing a first body to be attached thereto; a second tube unit having a second axis of rotation and allowing a second body to be attached thereto; a connecting member having two ends that are operatively connected with the first and second tube units, respectively, and allow the first and second tube units to rotate with respect to each other in a controlled manner; and the first tube unit in frictional contact with the second tube unit in a manner that the first axis of rotation is parallel but offset with the second axis of rotation, such that the first body is allowed to be flipped over the second body by 360 degrees.

The first and second tube units rotate with respect to each other in a controlled manner with a continuous or discontinuous movement to allow the first and second bodies to form different configurations such that the first and second bodies are temporarily fixed with their inner surfaces forming an angle therebetween within a range from about 0 degrees up to about 360 degrees.

The frictional contact is achieved by a first gear formed at the first tube unit that meshes with a second gear formed at the second tube unit.

The frictional contact is achieved by a rubberized or otherwise appropriate surface portion on at least one of the first or second tube units that provides sufficient friction to allow the first and second bodies to be folded and unfolded relative to each other.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
a first body;
a second body mounted in the first body to be folded and unfolded; and
hinge units for rotatably hinge-connecting the first and second bodies to each other, wherein,
the hinge units comprise:
a first hinge unit mounted in the first body;
a second hinge unit mounted in the second body, and rotatably engaged with the first hinge unit to have the same rotation angle as that of the first hinge unit; and
a connection unit for rotatably connecting the first hinge unit to the second hinge unit,
wherein the first hinge unit includes a first coupling bracket mounted in the first body and a first hinge portion formed at the first coupling bracket and rotatably hinge-connected to the connection unit,
wherein the second hinge unit includes a second coupling bracket mounted in the second body and a second hinge portion formed at the second coupling bracket and rotatably hinge-connected to the connection unit, and
wherein a first gear is formed at an outer circumferential surface of the first hinge portion in its circumferential direction, and a second gear is formed at an outer circumferential surface of the second hinge portion, the second gear being engaged with the first gear.

2. The terminal of claim 1, wherein the first body is provided with at least one display for displaying information and speakers for generating sounds.

3. The terminal of claim 2, wherein a pair of speakers are disposed at both edges of the first body in a longitudinal direction thereof.

4. The terminal of claim 3, wherein the pair of speakers is disposed at any of left and right sides from the center of the longitudinal direction of the first body.

5. The terminal of claim 1, wherein a protection portion prevents undesired objects from contacting at least one of the first and second gears.

6. The terminal of claim 5, wherein the protection portion comprises a first prevention board formed at a lateral surface of the first gear and a second prevention board formed at a lateral surface of the second gear.

7. The terminal of claim 6, wherein the first prevention board has a circular plate shape with a diameter greater than that of the first gear, and the second prevention board has a circular plate shape with a diameter greater than that of the second gear.

8. The terminal of claim 1, wherein the connection unit includes:
a first connection unit inserted into one end of the first and second hinge portions, respectively; and a second connection unit inserted into an opposing end of the first and second hinge portions, respectively, and coupled with the first connection unit.

9. The terminal of claim 8, wherein the first connection unit includes:
a first rod inserted into the one side of the first hinge portion to rotatably support the first hinge portion;
a second rod inserted into the one side of the second hinge portion to rotatably support the second hinge portion; and
a connection rod for connecting the first rod with the second rod.

10. The terminal of claim 9, wherein the second connection unit includes:
a first rod coupling portion inserted into the other side of the first hinge portion to couple the first hinge portion to the first rod;
a second rod coupling portion inserted into the other side of the second hinge portion to couple the second hinge portion to the second rod; and
a frame to which the first and second rod coupling portions are fixed.

11. The terminal of claim 10, wherein the frame is a camera mounting portion at which a camera is mounted.

12. The terminal of claim 10, wherein a hinge hole is formed at the frame such that a hinge pin formed at a support portion extending from the second coupling bracket of the second hinge unit is inserted therein to thus rotatably support the second hinge unit.

13. The terminal of claim 10, wherein a support rod is disposed between the frame and the first body to rotatably support the first body.

14. The terminal of claim 13, wherein one end of the support rod is rotatably hinge-connected to the frame, and the other end thereof is fixed to the first body.

15. The terminal of claim 10, wherein the first rod is insertedly coupled to the first rod coupling portion, and the second rod is insertedly coupled to the second rod coupling portion.

16. The terminal of claim 9, wherein the hinge unit further includes a position fixing unit disposed between the first hinge portion and the first rod and between the second hinge portion and the second rod, respectively, for fixing each rotated position of the first and second bodies when the first and second bodies are relatively rotated.

17. The terminal of claim 16, wherein the position fixing unit includes:
a plurality of grooves formed at an inner circumferential surface of the first hinge portion and an inner circumferential surface of the second hinge portion, respectively;
a support rod inserted to be linearly movable into an insertion groove formed at an outer circumferential surface of the first rod and a support rod inserted to be linearly movable into an insertion groove formed at an outer circumferential surface of the second rod in radius directions thereof, each support rod being inserted into one of the plurality of grooves at each hinge portion; and
a spring for applying an elastic force to each of the support rods.

18. The terminal of claim 17, wherein each of the plurality of grooves includes:
a first groove used to maintain the first and second bodies in a closed state;
a second groove used to lock the first body and the second body opened at an angle of 180° or less; and
a third groove used to lock the first body and the second body opened at an angle of more than 180°.

19. The terminal of claim 18, wherein the second groove is used to lock the opened position of the first and second bodies when the terminal is used in a communication mode.

20. The terminal of claim 18, wherein the third groove is used to lock the opened position of the first and second bodies when the terminal is used as a viewing mode for videos or multimedia broadcast receptions.

21. The terminal of claim 1, further comprising:
a support lever rotatably disposed at the second body for supporting the state of the terminal being laid in a horizontal direction thereof.

22. The terminal of claim 21, wherein a hinge pin which is hinge-connected to one lateral surface of the second body is formed at one end portion of the support lever, the other end portion of the support lever is rotatably mounted in the hinge unit, and the support lever is accommodated in an accommodation groove formed in the second body.

23. The terminal of claim 21, wherein the support lever includes an internal antenna for transmitting and receiving signals.

24. The terminal of claim 22, further comprising:
a locking unit disposed between the support lever and the hinge unit, for restraining the rotation of the hinge unit when the support lever is separated from the accommodation groove.

25. The terminal of claim 24, wherein the locking unit includes:
a cam portion formed at an end portion of the support lever;
a locking rod disposed in a state of being in contact with the cam portion, and moving in a vertical direction along a cam surface in response to the rotation of the support lever; and
a locking protrusion formed at the connection unit, for locking the hinge unit so as not to be rotated when the locking rod is caught by the locking protrusion.

26. The terminal of claim 25, wherein the locking rod is movably mounted in a guide groove formed at the second hinge unit in a vertical direction, and a spring is disposed between the locking rod and the guide groove to apply an elastic force by which the locking rod moves in its upper direction.

27. A hinge unit comprising:
a first hinge unit;
a second hinge unit rotatably engaged with the first hinge unit to have the same rotation angle; and
a connection unit rotatably connecting the first hinge unit to the second hinge unit,
wherein the first hinge unit includes a first coupling bracket mounted in a first body and a first hinge portion formed at the first coupling bracket and rotatably hinge-connected to the connection unit,
wherein the second hinge unit includes a second coupling bracket mounted in a second body and a second hinge portion formed at the second coupling bracket and rotatably hinge-connected to the connection unit, and
wherein a first gear is formed at an outer circumferential surface of the first hinge portion in its circumferential direction, and a second gear is formed at an outer circumferential surface of the second hinge portion, the second gear being engaged with the first gear.

28. The hinge unit of claim 27, wherein a protection portion prevents undesired objects from contacting at least one of the first and second gears.

29. The hinge unit of claim 28, wherein the protection portion comprises a first prevention board formed at a lateral surface of the first gear and a second prevention board formed at a lateral surface of the second gear.

30. The hinge unit of claim 29, wherein the first prevention board has a circular plate shape with a diameter greater than that of the first gear, and the second prevention board has a circular plate shape with a diameter greater than that of the second gear.

31. The hinge unit of claim 27, wherein the connection unit includes:
 a first connection unit inserted into one sides of both the first and second hinge portions; and
 a second connection unit inserted into the other sides of both the first and second hinge portions and coupled with the first connection unit.

32. The hinge unit of claim 31, wherein the first connection unit includes:
 a first rod inserted into the one side of the first hinge portion to rotatably support the first hinge portion;
 a second rod inserted into the one side of the second hinge portion to rotatably support the second hinge portion; and
 a connection rod for connecting the first rod with the second rod.

33. The hinge unit of claim 32, wherein the second connection unit includes:
 a first rod coupling portion inserted into the other side of the first hinge portion to couple the first hinge portion to the first rod;
 a second rod coupling portion inserted into the other side of the second hinge portion to couple the second hinge portion to the second rod; and
 a frame to which the first and second rod coupling portions are fixed.

34. The hinge unit of claim 33, wherein the frame is a camera mounting portion at which a camera is mounted.

35. The hinge unit of claim 33, wherein the first rod is insertedly coupled to the first rod coupling portion, and the second rod is insertedly coupled to the second rod coupling portion.

36. The hinge unit of claim 32, further comprising a position fixing unit disposed between the first hinge portion and the first rod and between the second hinge portion and the second rod, respectively, for fixing each rotated position of the first and second hinge units when the first and second hinge units are relatively rotated.

37. The hinge unit of claim 36, wherein the position fixing unit includes:
 a plurality of grooves formed at an inner circumferential surface of the first hinge portion and an inner circumferential surface of the second hinge portion, respectively;
 a support rod inserted to be linearly movable into an insertion groove formed at an outer circumferential surface of the first rod and a support rod inserted to be linearly movable into an insertion groove formed at an outer circumferential surface of the second rod in radius directions thereof, each support rod being inserted into one of the plurality of grooves at each hinge portion; and
 a spring for applying an elastic force to each of the support rods.

38. The hinge unit of claim 37, wherein each of the plurality of grooves includes:
 a first groove for locking a state of the first and second hinge units being folded;
 a second groove for locking a position at which the first hinge unit and the second hinge unit are opened by an angle less than 180°; and
 a third groove for locking a position at which the first hinge unit and the second hinge unit are opened by angle more than 180°.

* * * * *